US009093887B2

(12) United States Patent
Hasegawa (10) Patent No.: US 9,093,887 B2
(45) Date of Patent: Jul. 28, 2015

(54) BICYCLE GENERATOR HUB STATOR HAVING ANNULAR MEMBER AND THREE YOKES, AND BICYCLE GENERATOR HUB

(75) Inventor: Hiroshi Hasegawa, Osaka (JP)

(73) Assignee: Shimano Inc., Osaka (JP)

( * ) Notice: Subject to any disclaimer, the term of this patent is extended or adjusted under 35 U.S.C. 154(b) by 479 days.

(21) Appl. No.: 13/330,962

(22) Filed: Dec. 20, 2011

(65) Prior Publication Data

US 2012/0161589 A1  Jun. 28, 2012

(30) Foreign Application Priority Data

Dec. 24, 2010 (JP) ................................ 2010-288260

(51) Int. Cl.
*H02K 1/14* (2006.01)
*H02K 21/22* (2006.01)
*H02K 7/18* (2006.01)

(52) U.S. Cl.
CPC .............. *H02K 21/22* (2013.01); *H02K 7/1846* (2013.01)

(58) Field of Classification Search
CPC .............................. H02K 1/145; H02K 7/1846
USPC ........ 310/67 A, 263, 156.09, 156.13, 156.66, 310/156.73
See application file for complete search history.

(56) References Cited

U.S. PATENT DOCUMENTS

| 4,882,515 | A | * | 11/1989 | Radomski ...................... 310/263 |
| 5,828,145 | A | * | 10/1998 | Nakamura ................... 310/67 A |
| 7,170,206 | B2 | * | 1/2007 | Laxenaire et al. ............. 310/263 |
| 2004/0056559 | A1 | * | 3/2004 | Laxenaire et al. ............. 310/263 |
| 2008/0315716 | A1 | * | 12/2008 | Itoh et al. ...................... 310/263 |
| 2010/0013350 | A1 | * | 1/2010 | Fu ............................... 310/261.1 |
| 2010/0117494 | A1 | * | 5/2010 | Hasegawa .................... 310/67 A |
| 2010/0301711 | A1 | * | 12/2010 | Ando et al. .................. 310/67 A |

FOREIGN PATENT DOCUMENTS

| DE | 200 13 637 U1 | 10/2000 |
| DE | 20 2004 006 002 U1 | 8/2004 |
| DE | 10 2006 054 979 A1 | 10/2007 |
| EP | 1 632 427 A1 | 3/2006 |
| JP | 2003-333777 A | 11/2003 |
| JP | 2004-242374 A | 8/2004 |
| JP | 3107072 U | 11/2004 |

* cited by examiner

*Primary Examiner* — Michael Andrews
(74) *Attorney, Agent, or Firm* — Global IP Counselors (57) ABSTRACT

A bicycle generator hub stator has a hub shaft, an annular member and three yokes. The annular member includes a first axial end, a second axial end and a through hole extending between the first and second axial ends. The hub shaft extends through the through hole. The first and second yokes are non-rotatably arranged relative to the annular member. The third yoke is non-rotatably connected to both the annular member and the hub shaft. The first yoke includes a first extended section that extends in an axial direction from the first axial end to the second axial end of the annular member. The second yoke includes a second extended section that extends in the axial direction from the second axial end to the first axial end of the annular member. The third yoke is disposed in the through hole and magnetically couples the first and second yokes together.

12 Claims, 4 Drawing Sheets

BICYCLE GENERATOR HUB STATOR HAVING ANNULAR MEMBER AND THREE YOKES, AND BICYCLE GENERATOR HUB

CROSS-REFERENCE TO RELATED APPLICATIONS

This application claims priority under 35 U.S.C. §119 to Japanese Patent Application No. 2010-288260, filed Dec. 24, 2010. The entire disclosure of Japanese Patent Application No. 2010-288260 is hereby incorporated herein by reference.

BACKGROUND

1. Field of the Invention

This invention generally relates to a stator for bicycle generator hub that constitutes a hub for a wheel of a bicycle.

2. Background Information

A bicycle generator hub is generally provided with a cylindrical rotor and a stator arranged inside the rotor. A conventional bicycle generator hub typically includes a hub shaft, an annular member, a first yoke arranged at one end of the annular member, a second yoke arranged at the other end of the annular member and a third yoke arranged inside a through hole of the annular member. One example of such a conventional bicycle generator hub is disclosed in Japanese Laid-Open Patent Publication No. 2004-242374. In the conventional stator of a conventional bicycle generator hub, the yokes are provided in or on the annular member such that they do not rotate. Often, washers are arranged at both axial ends of the annular member on which the yokes are provided. Typically, the annular member is positioned in a circumferential direction with respect to the hub shaft by installing the washers in a non-rotatable state with respect to the annular member and the hub shaft.

SUMMARY

With the stator of the conventional bicycle hub described above, the structure is complex because two positioning members (washers) are necessary to position the annular member and the yokes with respect to the hub shaft in a circumferential direction.

One object of the present disclosure is to provide a bicycle generator hub stator for a bicycle generator hub that has a simpler structure.

In view of the state of the known technology, a bicycle generator hub stator according to a first aspect is provided that comprises a hub shaft, an annular member, a first yoke, a second yoke and a third yoke. A bicycle generator hub stator is provided with a hub shaft, an annular member, a first yoke, a second yoke and a third yoke. The annular member includes a first axial end, a second axial end and a through hole extending between the first and second axial ends. The hub shaft extends through the through hole. The first yoke includes a first extended section that extends in an axial direction from the first axial end to the second axial end of the annular member. The first yoke is non-rotatably arranged relative to the annular member. The second yoke includes a second extended section that extends in the axial direction from the second axial end to the first axial end of the annular member. The second yoke is non-rotatably arranged relative to the annular member. The third yoke is disposed in the through hole and magnetically couples the first and second yokes together. The third yoke is non-rotatably connected to both the annular member and the hub shaft.

With this bicycle generator hub stator, the third yoke is arranged inside the through hole of the annular member, magnetically couples the first yoke and the second yoke together, and is non-rotatably connected to both the annular member and the hub shaft. Thus, the annular member, the first yoke, and the second yoke are non-rotatably connected to the hub shaft through the third yoke and positioned with respect to the hub shaft in a circumferential direction of the annular member (circumferential direction of the hub shaft). As a result, the structure can be simplified because it is not necessary to provide washers or other positioning members on both axial ends of the annular member in order to position the annular member with respect to the hub shaft in a circumferential direction.

A bicycle generator hub stator according to a second aspect is provided according to the first aspect, wherein the third yoke is non-rotatably connected to the annular member inside the through hole. In this aspect, the axial length of the annular member can be kept compact even though the third yoke is connected to the annular member because the third yoke is non-rotatably connected to the annular member from inside the through hole.

A bicycle generator hub stator according to a third aspect is provided according to the first or second aspect, wherein the third yoke is non-rotatably connected to the annular member by an engagement between a first protrusion of one of the annular member and the third yoke, and a first recess of the other of the annular member and the third yoke. The connecting structure is simple because the annular member and the third yoke are non-rotatably connected by an engagement between a protrusion and a recess.

A bicycle generator hub stator according to a fourth aspect is provided according to any one of the first to third aspects, wherein the third yoke is non-rotatably connected to the hub shaft by an engagement between a second protrusion of one of the hub shaft and the third yoke, and a second recess of the other of the hub shaft and the third yoke. The connecting structure is simple because the third yoke and the hub shaft are non-rotatably connected by an engagement between a protrusion and a recess.

A bicycle generator hub stator according to a fifth aspect is provided according to the fourth aspect, wherein the second protrusion and the second recess are arranged inside the through hole. With this aspect, even though the third yoke is connected to the hub shaft, the axial length of the third yoke is more compact because the hub shaft and the third yoke are non-rotatably connected from inside the through hole.

A bicycle generator hub stator according to a sixth aspect is provided according to the fifth aspect, wherein the second recess is formed in an outer circumferential surface of the hub shaft and extends in the axial direction from one axial end of the hub shaft. With this aspect, an axially extending groove formed in an external circumferential surface of the hub shaft for passing electrical wiring can serve dually as the second recess.

A bicycle generator hub stator according to a seventh aspect is provided according to any one of the first to sixth aspects, wherein the third yoke has an annular shape. With this aspect, the third yoke is easier to arrange in the through hole because it is annular in shape.

A bicycle generator hub stator according to an eighth aspect is provided according to any one of the first to seventh aspects, wherein the first and second yokes are fixed to the annular member. In this aspect, since the first yoke and the second yoke are fixed to the annular member, first yoke and the second yoke are non-rotatably connected to the hub shaft through the annular member and the third yoke.

A bicycle generator hub stator according to a ninth aspect is provided according to any one of the first to eighth aspects, and further comprises a first positioning member being attached to the hub shaft at the first axial end of the annular member by crimping, the first positioning member positioning the annular member and the first, second and third yokes along an axial direction of the annular member. With this aspect, since the first positioning member is attached to the hub shaft by crimping, an excessive force will not act on the first yoke at the one axial end of the annular member, which could occur if the positioning was accomplished using, for example, a nut.

A bicycle generator hub stator according to a tenth aspect is provided according to the ninth aspect, and further comprises a second positioning member being attached to the hub shaft at the second axial end of the annular member by crimping and serves to position the annular member and the first, second and third yokes along an axial direction of the annular member. With this aspect, since the second positioning member is attached to the hub shaft by crimping, an excessive force will not act on the second yoke at the other axial end of the annular member, which could occur if the positioning was accomplished using, for example, a nut.

A bicycle generator hub stator according to an eleventh aspect is provided according to any one of the first to tenth aspects, wherein the annular member includes a first flange provided on the first axial end and a second flange provided on the second axial end. The first extended section includes an end portion, corresponding to the second axial end of the annular member, which is supported on the second flange, and the second extended section includes an end portion, corresponding to the first axial end of the annular member, which is supported on the first flange. With this aspect, the first extended section extending from the first yoke at the first axial end of the annular member and the second extended section extending from the second yoke at the second axial end of the annular member can be held in a stable fashion because the first extended section is supported on the second flange at an end portion of the first extended section located closer to the second axial end of the annular member and the second extended section is supported on the first flange at an end portion of the second extended section located closer to the first axial end of the annular member.

A bicycle generator hub according to a twelfth aspect is provided according to any one of the first to tenth aspects. With this bicycle generator hub, the structure of the bicycle generator hub can be simplified because the stator according to any one of the first to tenth aspects is used.

With the bicycle generator hub of the present disclosure, the annular member and the first and second yokes are non-rotatably connected to the hub shaft through the third yoke and positioned in a circumferential direction. As a result, the structure of a bicycle generator hub stator, and thus, the structure of the bicycle generator hub is simplified in comparison with a conventional bicycle generator hub.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
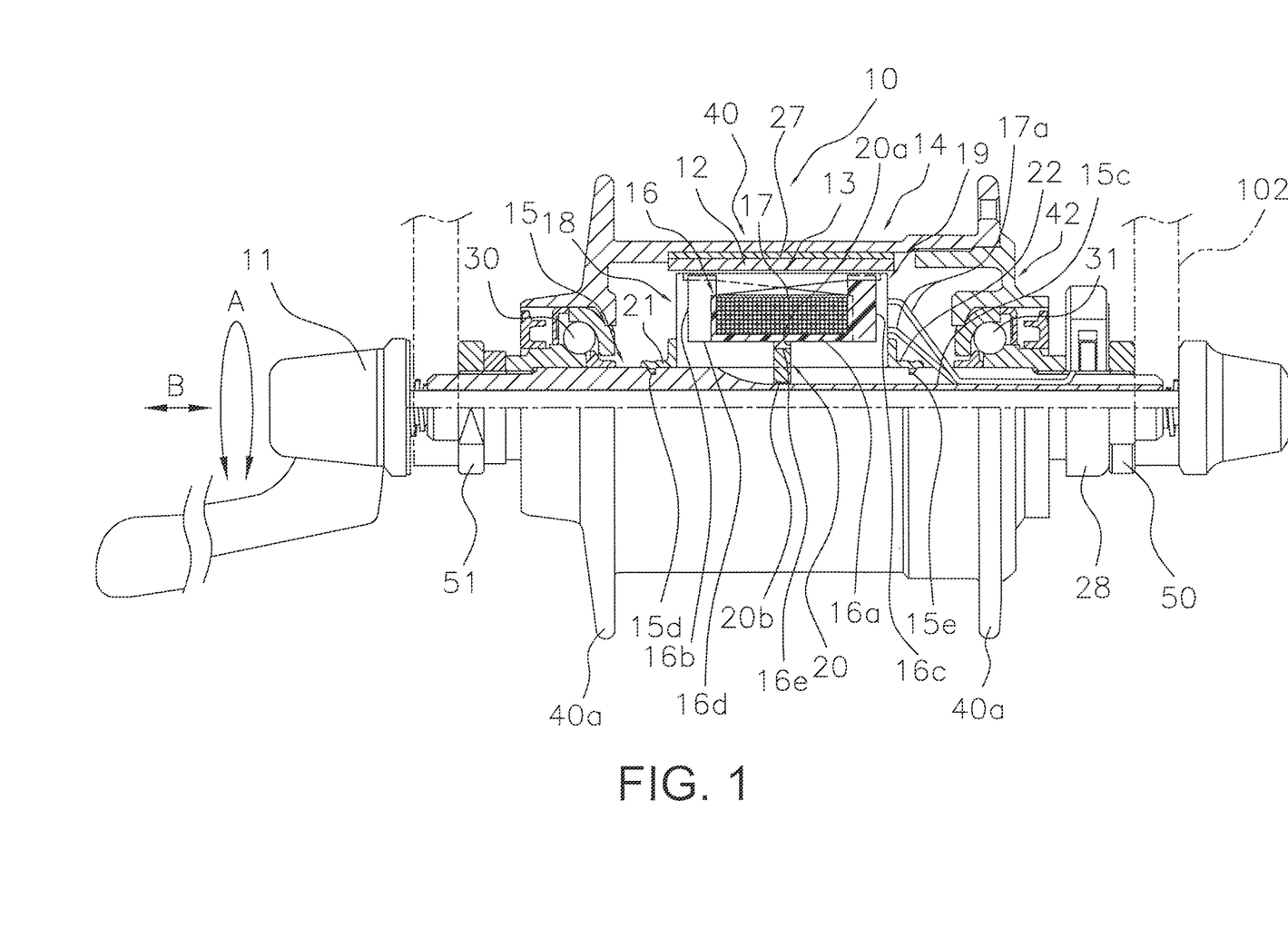
FIG. 1 is a half cross sectional view of a bicycle generator hub equipped with a bicycle generator hub stator in accordance with a first embodiment.

Referring initially to FIG. 1, a bicycle generator hub (hub dynamo) 10 is illustrated in accordance with a first embodiment. The bicycle generator hub is configured to be installed on a front fork 102 of a bicycle using, for example, a quick release mechanism 11. The generator hub 10 includes an annular magnet 12 and a bicycle generator hub stator 13 that form the dynamo. The generator hub 10 further includes a hub shell 14 and a hub shaft 15. The hub shell 14 is rotatably attached to the hub shaft 15. The annular magnet 12 is provided on an internal circumferential surface of the hub shell 14. The magnet 12 has a plurality of magnetic poles. The magnetic poles of the magnet 12 are arranged along a circumferential direction around the hub shaft 15.

Figure 2:
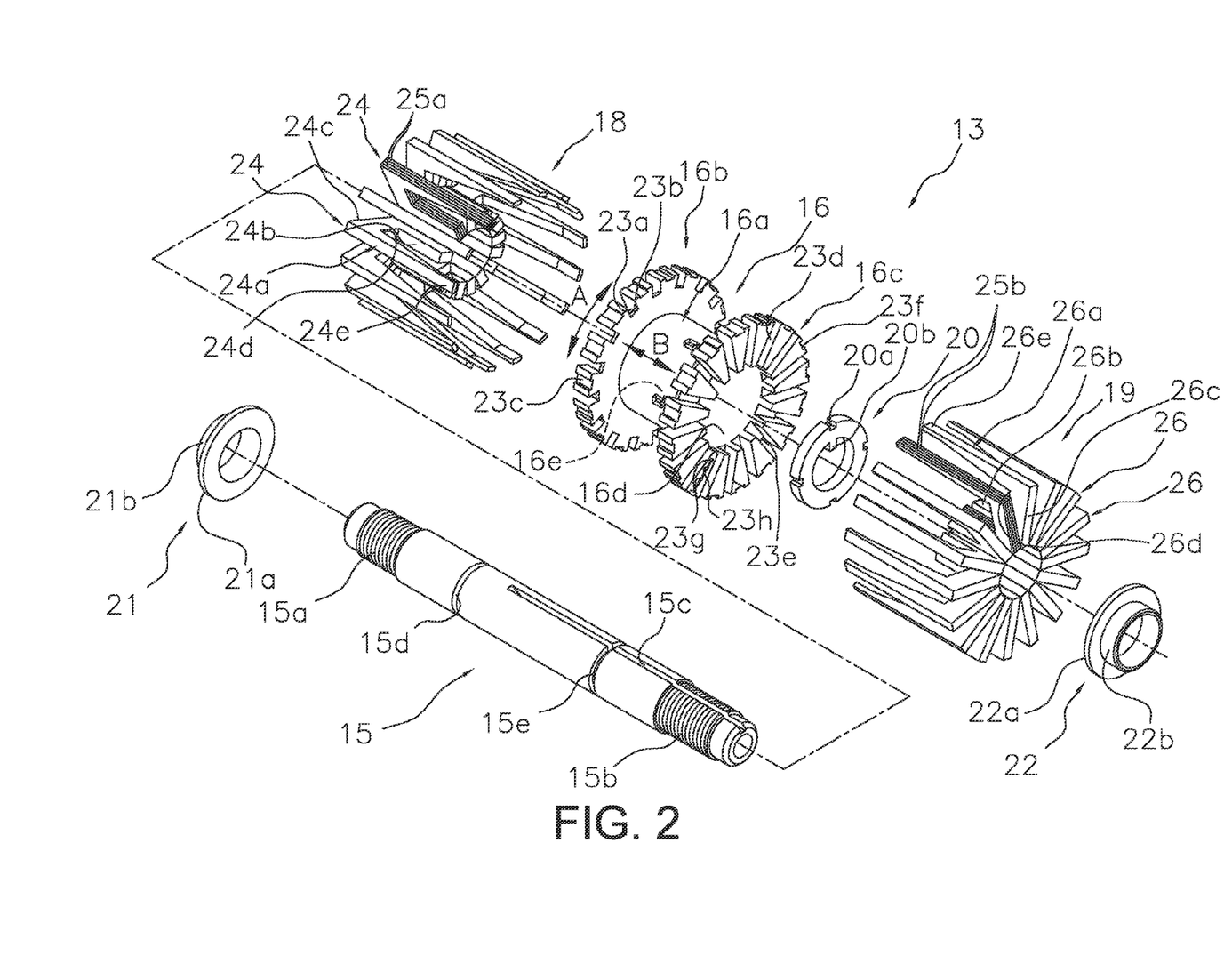
FIG. 2 is an exploded perspective view of the bicycle generator hub stator of the bicycle generator hub illustrated in FIG. 1.
Figure 3:
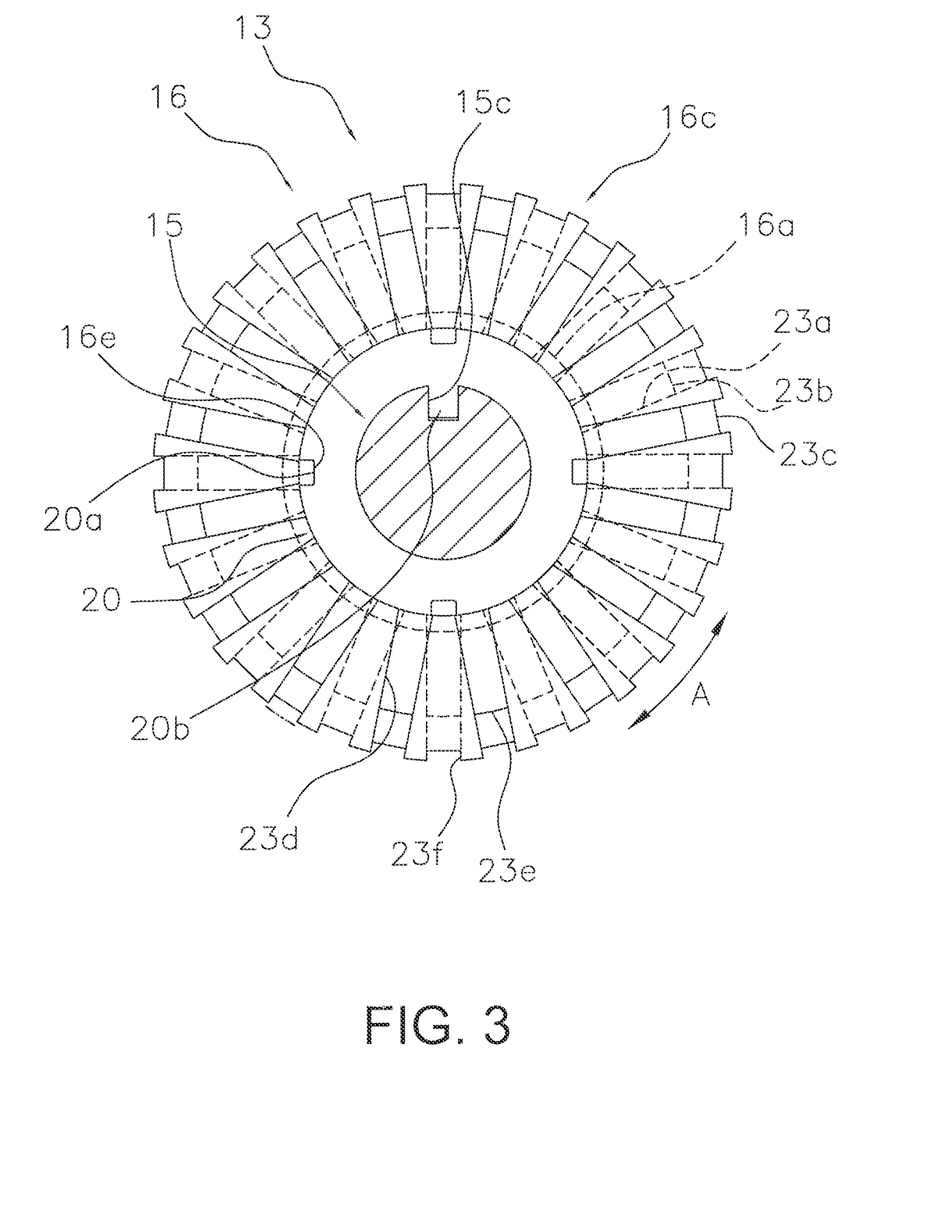
FIG. 3 is an axial end elevational view of the bicycle generator hub stator with the first and second yokes removed.

The generator hub 10 further includes an annular member 16, a coil 17, a first yoke 18, a second yoke 19 and a third yoke 20, which together with the hub shaft 15 form parts of the bicycle generator hub stator 13 as explained later. In FIGS. 1 to 3, an arrow A indicates a circumferential direction of the annular member 16. In FIGS. 1 and 2, an arrow B indicates an axial direction of the annular member 16. In this embodiment, the hub shaft 15 and the annular member 16, as well as the first yoke 18, the second yoke 19, and the third yoke 20 are arranged coaxially. Thus, the arrow A indicates a circumferential direction and the arrow B indicates an axial direction of all of these components.

Now, the bicycle generator hub stator 13 will be discussed in more detail. The bicycle generator hub stator 13 basically comprises the hub shaft 15, the annular member 16, the first yoke 18, the second yoke 19 and the third yoke 20. The hub shaft 15 extends through the annular member 16 such that opposite axial ends of the hub shaft 15 protrude out from opposite axial ends of the annular member 16. The coil 17 is wound onto an outer peripheral surface of the annular member 16. The first and second yokes 18 and 19 are provided on the annular member 16. The third yoke 20 magnetically couples the first and second yokes 18 and 19 together. The third yoke 20 is non-rotatably connected to both the hub shaft 15 and the annular member 16. The stator 13 further comprises a first positioning member 21 and a second positioning member 22. The first positioning member 21 is arranged at the first axial end (left-hand end in FIGS. 1 and 2) of the annular member 16. The second positioning member 22 is arranged at the second axial end (right-hand end in FIGS. 1 and 2) of the annular member 16. Thus, the positioning members 21 and 22 are separated from each other along an axial direction of the hub shaft 15 as indicated by the arrows B in FIGS. 1 and 2.

As shown in FIGS. 1 and 2, the hub shaft 15 is hollow tubular member that is configured to be detachably fastened to the front fork 102 with the quick release mechanism 11. A first externally threaded section 15a is formed on an external circumferential surface of the first axial end (left-hand end in FIG. 1) of the hub shaft 15. A second externally threaded section 15b is formed on an external circumferential surface of a second axial end (right-hand end in FIG. 2) of the hub shaft 15. A connector 28 is fixed to the second externally threaded section 15b by a nut member 50. The connector 28 supplies electric power from the coil 17 to a headlamp or other external device.

Additionally, an axial groove 15c extending in an axial direction from a middle portion to the second axial end is formed in the external circumferential surface of the hub shaft 15. The axial groove 15c is used to arrange an electrical wire 17a that extends from the coil 17. The axial groove 15c is an example of a second recess. A first annular groove 15d is formed in the external circumferential surface of the hub shaft 15 for crimping the first positioning member 21. A second annular groove 15e formed in the external circumferential surface of the hub shaft 15 for crimping the second positioning member 22. The second annular groove 15e cuts across the axial groove 15c. A depth of the axial groove 15c is larger than a depth of the second annular groove 15e in order to accommodate arranging the electrical wire 17a.

The annular member (bobbin) 16 has the coil 17 wound thereon. The first and second yokes 18 and 19 are attached to the annular member with an adhesive, for example. The annular member 16 is positioned on the hub shaft 15 such that the annular member faces opposite an internal circumferential surface of the magnet 12. The annular member 16 has a cylindrical section 16a, a first flange 16b and a second flange 16c. The cylindrical section 16a has an external circumferential surface on which the coil 17 is wound. The first flange 16b is provided on the first axial end of the cylindrical section 16a along the axial direction as indicated by the arrows B (left side in FIGS. 1 and 2). The second flange 16c is provided on the second axial end of the cylindrical section 16a along the axial direction as indicated by the arrows B (right side in FIGS. 1 and 2). The hub shaft 15 extends through a through hole 16d of the cylindrical section 16a. The annular member 16 is non-rotatably connected to the third yoke 20 inside the through hole 16d. The annular member 16 has at least one first protrusion 16e that protrudes radially inward inside the through hole 16d. As shown in FIG. 3, in the first embodiment, there are four of the first protrusions 16e that are arranged with equal spacing inside the through hole 16d. As shown in FIG. 2, the first protrusions 16e are formed in an axially middle portion (midway along the axial direction as indicated by the arrows B) inside the through hole 16d.

As shown in FIG. 2, the first flange 16b includes a plurality of (e.g., sixteen) first grooves 23a formed on its radially outward surface and a plurality of (e.g., sixteen) first notch 23b formed on its outer peripheral edge. The first grooves 23a are spaced apart in a circumferential direction of the hub shaft 15. The first grooves 23a are used to attach the first yoke 18. The first grooves 23a extend radially outward from the through hole 16d. The first notches 23b are formed by notching out a radially outward portion of the first flange 16b at each of the first grooves 23a. The first notches 23b are formed radially outward of each of the first grooves 23a. The first flange 16b includes a plurality of second notches 23c that are shallower than the first notches 23b. The second notches 23c are formed between the first notches 23b. The second notches 23c support a tip end portion of the second yoke 19, i.e., the end of the second yoke 19 that is located nearer the first axial end of the annular member 16.

As shown in FIG. 2, the second flange 16c includes a plurality of (e.g., sixteen) second grooves 23d formed on its radially outward surface and a plurality of (e.g., sixteen) third notches 23e formed on its outer peripheral edge. The second grooves 23a are spaced apart in a circumferential direction of the hub shaft 15. The second grooves 23a are used to attach the second yoke 19. The second grooves 23d are arranged in positions between the first grooves 23a. Thus, the second grooves 22c are arranged in positions that are the same as the positions of the second notices 23c along the direction as indicated by the arrows A (circumferential direction). The second grooves 23d extend radially outward from the through hole 16d. One of the second grooves 23d has two through holes 23g and a slit 23h. The two through holes 23g are provided for drawing the two ends of the coil 17 to the outside of the second flange 16c. The slit 23h is provided for passing the coil 17 in a radial direction. The third notches 23e are formed by notching out a radially outward portion of the second flange 16c at each of the second grooves 23d. The third notches 23e are formed radially outward of each of the second grooves 23d. The second flange 16c includes a plurality of fourth notches 23f that are shallower than the third notches 23e. The fourth notches 23f are formed between the third notches 23e. The fourth notches 23f support a tip end portion of the first yoke 18, i.e., the second axial end of the first yoke 18 located nearer the second axial end of the annular member 16.

A shown in FIG. 1, the coil 17 is wound onto a cylindrical section 16a of an annular member 16. The coil 17 is made of a conductive metal wire material, such as a copper wire or an aluminum alloy wire. Two electrical wires 17a are electrically connected to both ends of the coil 17. The electrical wires 17a are provided to carry electric power generated in the coil 17 to the outside of the hub. The electrical wires 17a are arranged in the axial groove 15c explained previously.

As shown in FIG. 2, the first yoke 18 has a plurality of (e.g., sixteen) first laminated yokes 24. Each of the first laminated yokes 24 comprises, for example, a plurality of laminate pieces 25a. Each of the first laminated yokes 24 includes a silicon steel plate (more specifically, an non-oriented silicon steel plate) having an oxide film formed on a surface thereof. Although the laminate pieces 25a are only shown on one of the first laminated yokes 24 in FIG. 2, all of the first laminated yokes 24 are made of laminate pieces 25a. Each of the first laminated yokes 24 has a first extended section 24a that extends along the direction of an arrow B from a side corresponding to the first axial end of the annular member 16 toward a side corresponding to the second axial end of the annular member 16. Each of the first laminated yokes 24 also has a first insertion section 24b and a first outer section 24c. For each of the first laminated yokes 24, the first outer section 24c joins the first extended section 24a and the first insertion section 24b together. The first extended sections 24a are arranged on a radially outward side of the coil 17. The first extended sections 24a extend from the first axial end of the annular member 16 to the second axial end of the annular member 16.

A radially outward portion of each of the first extended sections 24a is arranged such that the radially outward portion is substantially parallel to the hub shaft 15. Each of the first extended sections 24a is configured such that a radially inward portion slants toward the radially outward portion as one moves from the first axial end of the annular member 16 toward the second axial end and a tip end portion of the radially inward portion is substantially parallel to the hub shaft 15.

Each of the first laminated yokes 24 also has a first base end section 24d and a first tip end sections 24e. The first base end sections 24d are located at the end of the first extended sections 24a corresponding to the first axial end of the annular member 16. The first base end sections 24d are supported in the first notches 23b of the annular member 16. The first tip end sections 24e are located at the end of the first extended sections 24a corresponding to the second axial end of the annular member 16. The first tip end sections 24e are supported in the fourth notches 23f. The first insertion sections 24b are inserted into the through hole 16d of the annular member 16 such that they are arranged between the cylindrical section 16a and the external circumferential surface of the hub shaft 15 and extend from the first axial end of the annular member 16 toward the second axial end along the axial direction as indicated by the arrows B. More specifically, the first insertion sections 24b extend along the axial direction as indicated by the arrows B to a position near a middle portion of the through hole 16d. The first outer sections 24c are fixed to the annular member 16 by being fitted into the first grooves 23a of the first flange 16b. As a result, the first yoke 18 cannot rotate with respect to the annular member 16.

The second yoke 19 has a plurality of (e.g., sixteen) second laminated yokes 26. In this embodiment, the second laminated yoke 26 has the same shape as the first laminated yoke 24. Each of the second laminated yokes 26 comprises, for example, a plurality of laminate pieces 25b. Each of the second laminated yokes includes a silicon steel plate (more specifically, an non-oriented silicon steel plate) having an oxide film formed on a surface thereof. Although the laminate pieces 25b are only shown on one of the second laminated yokes 26 in FIG. 2, all of the second laminated yokes 26 are made of laminate pieces 25b. Each of the second laminated yokes 26 has a second extended section 26a that extends along the direction of an arrow B from a side corresponding to the second axial end of the annular member 16 toward a side corresponding to the first axial end of the annular member 16. Each of the second laminated yokes 26 also has a second insertion section 26b and a second outside section 26c. For each of the second laminated yokes 26, the second outside section 26c joins the second extended section 26a and the second insertion section 26b together. The second extended section 26a is arranged on a radially outward side of the coil 17. The second extended section 26a extends from the other of the annular member 16 to the first axial end. The second extended sections 26a are arranged alternately with respect to the first extended sections 24a along the circumferential direction as indicated by the arrows A (see FIG. 2).

A radially outward portion of each of the second extended sections 26a is arranged such that the radially outward portion is substantially parallel to the hub shaft 15. Each of the second extended sections 26a is configured such that a radially inward portion slants toward the radially outward portion as one moves from the second axial end of the annular member 16 toward the first axial end and a tip end portion of the radially inward portion is substantially parallel to the hub shaft 15.

Each of the second laminated yokes 26 also has a second base end section 26d and a tip second end section 26e. The second base end sections 26d are located at the end of the second extended sections 26a corresponding to the second axial end of the annular member 16. The second base end sections 26d are supported in the third notches 23e of the annular member 16. The second tip end sections 26e are located at the end of the second extended sections 26a corresponding to the first axial end of the annular member 16. The second tip end sections 26e are supported on the second notches 23c of the annular member 16. The second insertion sections 26b are inserted into the through hole 16d of the annular member 16 such that they are arranged between the cylindrical section 16a and the external circumferential surface of the hub shaft 15 and extend from the second axial end of the annular member 16 to the second axial end along the axial direction as indicated by the arrows B. More specifically, the second insertion sections 26b extend along the axial direction as indicated by the arrows B to a position near a middle portion of the through hole 16d. The second outer sections 26c are fixed to the annular member 16 by being fitted into the second grooves 23d of the second flange 16c. As a result, the second yoke 19 cannot rotate with respect to the annular member 16.

As shown in FIGS. 2 and 3, the third yoke 20 is an annular member made of, for example, silicon steel. The third yoke 20 is non-rotatably connected to both the hub shaft 15 and the annular member 16. The third yoke 20 is arranged inside the through hole 16d between the cylindrical section 16a and the external circumferential surface of the hub shaft 15. As a result, the third yoke 20 contacts the tip ends of the first insertion sections 24b of the first laminated yokes 24 and the tip ends of the second insertion sections 26b of the second laminated yokes 26. Consequently, the third yoke 20 can magnetically couple the first yoke 18 and the second yoke 19 together. The third yoke 20 constitutes a magnetic circuit surrounding the coil 17.

At least one first recess 20a is formed in an external circumferential surface of the third yoke 20. In this embodiment, four of the first recesses 20a are provided to correspond to the four first protrusions 16e. The recesses 20a engage the first protrusions 16e of the annular member 16. A second protrusion 20b is provided on an internal circumferential surface of the third yoke. The second protrusion 20b engages the axial groove 15c (serving as a second recess) of the hub shaft 15. The second protrusion 20b serves to non-rotatably connect the third yoke 20 and the hub shaft 15 together. The first and second yokes 18 and 19 are attached to the annular member 16. The annular member 16 is non-rotatably connected to the hub shaft 15 through the third yoke 20 such that the annular member 16 is positioned with respect to the hub shaft 15 in the circumferential direction as indicated by the arrows A.

As shown in FIGS. 1 and 2, the first positioning member 21 is crimped to the hub shaft 15 at the first axial end of the annular member 16. The first positioning member 21 is, for example, an aluminum alloy, an iron-based alloy, or another metal. As shown in FIG. 2, the first positioning member 21 has a first brim section 21a that contacts the first yoke 18 and a first cylindrical section 21b that fits onto an external circumferential surface of the hub shaft 15. The first cylindrical section 21b is arranged in a position where the first cylindrical section 21b overlaps with the first annular groove 15d when the first brim section 21a contacts the first yoke 18. The first positioning member 21 is crimped onto the hub shaft 15 such that the first positioning member 21 cannot move along the axial direction as indicated by the arrows B due to the deformation of the first cylindrical section 21b toward the first annular groove 15d.

As shown in FIGS. 1 and 2, the second positioning member 22 is crimped to the hub shaft 15 at the second axial end of the annular member 16. The second positioning member 22 is made of the same material as the first positioning member 21. As shown in FIG. 2, similarly to the first positioning member 21, the second positioning member 22 has a second brim section 22a that contacts the second yoke 19 and a second cylindrical section 22b that fits onto an external circumferential surface of the hub shaft 15. The second cylindrical section 22b is arranged in a position where the second cylindrical section 22b overlaps with the second annular groove 15e when the second brim section 22a contacts the second yoke 19. The second positioning member 22 is crimped onto the hub shaft 15 such that the second positioning member 22 cannot move along the axial direction as indicated by the arrows B due to the deformation of the second cylindrical section 22b toward the second annular groove 15e.

In this way, the first positioning member 21 and the second positioning member 22 serve to position the annular member 16, the first yoke 18, the second yoke 19, and the third yoke 20 along the axial direction as indicated by the arrows B. Thus, an excessively large axial force does not act on the first laminated yoke 24 of the first yoke 18 and the second laminated yoke 26 of the second yoke 19 as can happen when axial positioning is accomplished using, for example, a nut. As a result, the first and second yokes 18 and 19 do not readily deform.

As shown in FIG. 1, the hub shell 14 is rotatably supported on the hub shaft 15 by a first bearing 30 and a second bearing 31. A position of the first bearing 30 along the axial direction as indicated by the arrows B is adjusted with a nut member 51. The hub shell 14 has a cylindrical shell body 40 in and a lid member 42. The first bearing 30 is arranged in the cylindrical shell body 40. The second bearing 31 is arranged in the lid member 42. The lid member 42 is attached to the shell body 40. Two hub flanges 40a are arranged on the shell body 40 to be spaced apart from each other along the axial direction as indicated by the arrows B and serve as a place where the hub connects to the rim of the wheel by a plurality of spokes.

The magnet 12 is fixed to an internal circumferential surface of the shell body 40. A back yoke 27 is arranged between the magnet 12 and the shell body 40. A small gap exists between the internal circumferential surface of the magnet 12 and a radially outward portion of each of the first and second yokes 18 and 19.

When the stator 13 is to be assembled, the coil 17 is wound onto the cylindrical section 16a of the annular member 16. After winding of the coil 17 is finished, the first insertion sections 24b of the first laminated yokes 24 are arranged in the through hole 16d and the first extended sections 24a are arranged in the first notches 23b such that the first outer sections 24c are fitted into the first grooves 23a. Next, the third yoke 20 is installed inside the through hole 16d. The third yoke 20 is arranged such that the first recesses 20a engage with the first protrusions 16e of the annular member 16. After the third yoke 20 is installed, the second yoke 19 is attached similarly to the first yoke 18. That is, the second insertion sections 26b of the second laminated yokes 26 are arranged in the through hole 16d and the second extended sections 26a are arranged in the third notches 23e such that the second outer sections 26c are fitted into the second grooves 23d. In this way, the first extended sections 24a of the first yoke 18 and the second extended sections 26a of the second yoke 19 are arranged in an alternating fashion along the circumferential direction as indicated by the arrows A (see FIG. 2). Also, the first and second yokes 18 and 19 can be magnetically coupled together by the third yoke 20.

After the yokes are assembled on the annular member 16, the hub shaft 15 is inserted into the first insertion sections 24b of the first yoke 18 from the first axial end side of the annular member 16. The hub shaft 15 is installed such that the second protrusion 20b of the third yoke 20 engages with the axial groove 15c of the hub shaft 15. As a result, the annular member 16 and the first and second yokes 18 and 19 are non-rotatably connected to the hub shaft 15 through the third yoke 20 and positioned in the circumferential direction as indicated by the arrows A. As a result, the structure of the bicycle generator hub stator and, thus, the structure of a bicycle generator hub according to this embodiment is simplified in comparison with the prior art.

When the hub shaft 15 is installed, a special tool or other means is used to arrange the annular member 16 in a prescribed position along the hub shaft 15 in the axial direction as indicated by the arrows B (see FIGS. 1 and 2) such that the coil 17 can be arranged facing radially-toward the magnet 12. After the annular member 16 has been arranged in the prescribed position, the first positioning member 21 is attached to the hub shaft 15 on the one side of the annular member 16 such that the first brim section 21a contacts the first yoke 18 and the second positioning member 22 is attached to the hub shaft 15 on the other side of the annular member 16 such that the second brim section 22a contacts the second yoke 19. With the first brim section 21a contacting the first yoke 18 and the second brim section 22a contacting the second yoke 19, an appropriate crimping tool is used to press and deform an external circumferential surface of the first cylindrical section 21b toward the first annular groove 15d and press and deform an external circumferential surface of the second cylindrical section 22b toward the second annular groove 15e. As a result, the annular member 16, the first yoke 18, the second yoke 19, and the third yoke 20 are positioned along the axial direction as indicated by the arrows B. Since the annular member 16, the first yoke 18, and the second yoke 19 are non-rotatably connected to the hub shaft 15 through the third yoke 20, the first and second positioning members 21 and 22 need only contact the first and second yokes 18 and 19 during the process of positioning in the axial direction as indicated by the arrows B and it is not necessary to press the first positioning member 21 and the second positioning member 22 strongly against the first and second yokes 18 and 19, respectively. As a result, deformation of the first and second yokes 18 and 19 can be suppressed.

Figure 4:
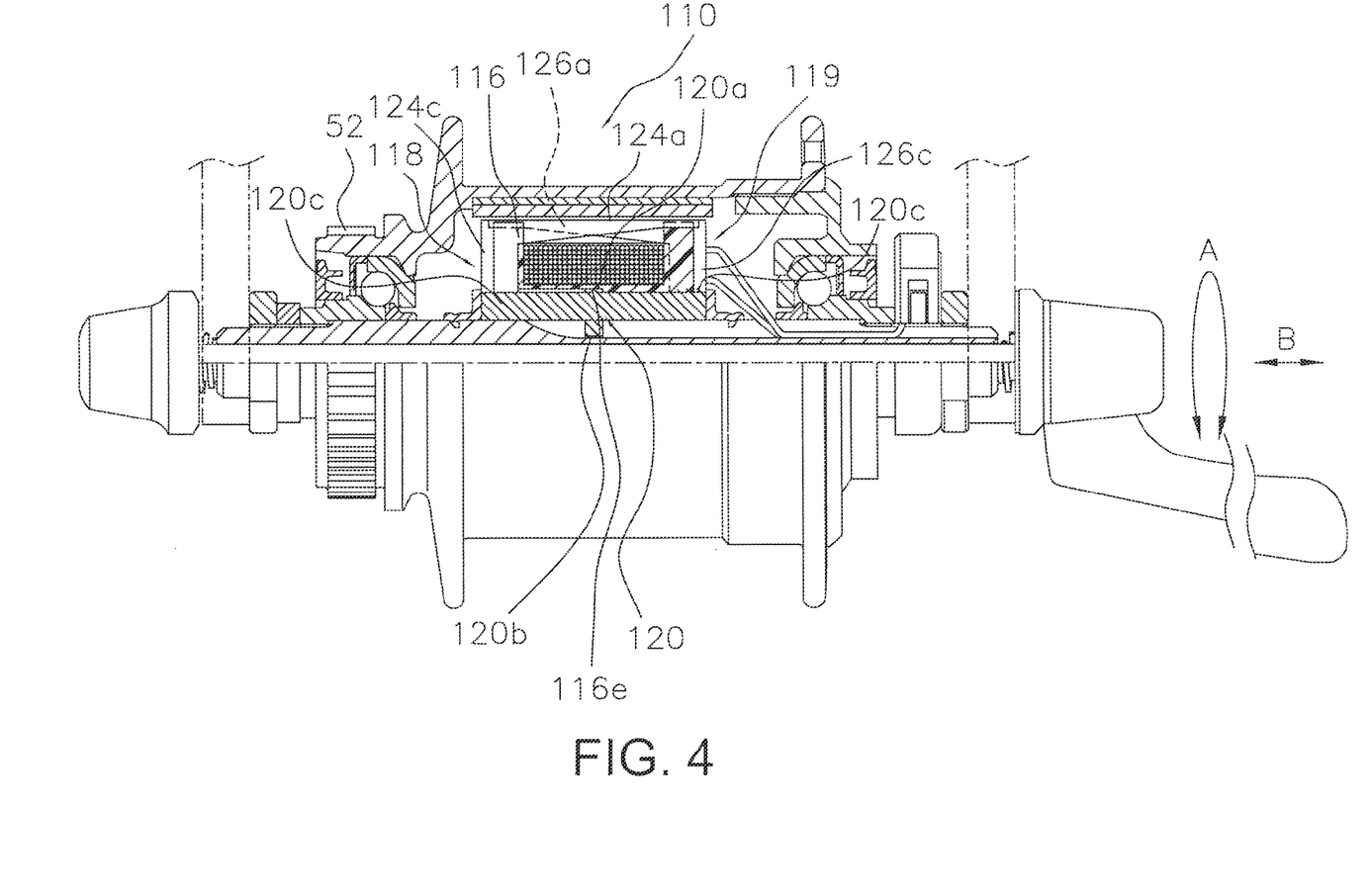
FIG. 4 is a half cross sectional view of a bicycle generator hub equipped with a bicycle generator hub stator in accordance with a second embodiment.

As shown in FIG. 4, a bicycle generator hub 110 is illustrated in accordance with a second illustrated embodiment. In the second illustrated embodiment, it is possible to provide a mounting section 52 on the generator hub 110 to mount, for example, a rotor for a disk brake device or a drum for a roller brake device on the mounting section 52. Other than the features that will now be explained, the constituent features are the same as in the previously explained embodiment.

Similar to the generator hub 10, the stator of generator hub 110 has an annular member 116, a first yoke 118, a second yoke 119 and a third yoke 120. The third yoke 120 has a first protrusion 120a and a plurality of protruding sections 120c. The protruding sections 120c protrude from both ends of the annular member 116. A first recess 116e of the annular member 116 is formed in an internal circumferential surface of a through hole 116d of the annular member 116. The first recess 116e has a groove-like shape and extends from a middle portion of the annular member 116 toward one end of the annular member 116 along the axial direction as indicated by the arrows B. The first protrusion 120a is formed in an external circumferential surface of the third yoke 120. The first protrusion 120a engages the first recess 116e and protrudes radially outward at a middle portion of the through hole 116d along the axial direction as indicated by the arrows B. The first and second yokes 118 and 119 do not have first and second insertion sections, but do have a plurality of first extended sections 124a and a plurality of second extended sections 126a as well as a plurality of first outer sections 124c and a plurality of second outer sections 126c. The first and second extended sections 124a and 126a are magnetically coupled to the protruding sections 120c of the third yoke 120. A generator hub with these constituent features can achieve similar operational effects to those achieved with the previously explained embodiment.

While only selected embodiments have been chosen to illustrate the bicycle generator hub stator, it will be apparent to those skilled in the art from this disclosure that various changes and modifications can be made herein without departing from the scope of the invention as defined in the appended claims.

Although in the previously explained embodiment the hub shaft 15 is fastened to the front fork with a quick release mechanism 11, it is acceptable to use a solid hub shaft fastened to the front fork with nuts.

Although in the previously explained embodiment the annular member 16 has the first protrusion 16e and the third yoke 20 has the first recess 20a, it is acceptable for the first protrusion and the first recess to be reversed, i.e. for the annular member to have a first recess and the third yoke to have a first protrusion.

Although in the previously explained embodiment the third yoke 20 has a second protrusion 20b and the hub shaft 15 has an axial groove 15c serving as a second recess, it is acceptable for the second protrusion and the second recess to be reversed, i.e., for the third yoke to have a second recess and the hub shaft to have a second protrusion. In such a case, the protrusion of the hub shaft is preferably provided as a separate member instead of an integral portion of the hub shaft.

Although in the previously explained embodiment the third yoke 20 is arranged inside the through hole 16d, the bicycle generator hub stator 13 is not limited to such an arrangement.

Although in the previously explained embodiment the third yoke 20 is arranged inside the through hole 16d such that it cannot rotate with respect to the annular member 16, the bicycle generator hub stator 13 is not limited to such an arrangement. It is also acceptable if a third yoke is non-rotatably connected to an annular member at a portion external to a through hole.

Although in the previously explained embodiment the bicycle generator hub stator 13 is applied to a bicycle generator hub fastened to a front fork of a bicycle, the bicycle generator hub stator 13 is not limited to such an application. The stator 13 is also applicable to a bicycle generator hub fastened to a rear end of a bicycle frame.

Thus, the foregoing descriptions of the embodiments according to the present invention are provided for illustration only, and not for the purpose of limiting the invention as defined by the appended claims and their equivalents.

What is claimed is:

1. A bicycle generator hub stator comprising:
   a hub shaft having an axial groove formed as a second recess in an outer circumferential surface of the hub shaft, the axial groove extending in an axial direction from one axial end of the hub shaft toward the other axial end of the hub shaft such that the axial groove ends at a middle portion of the hub shaft;
   an annular member including a first axial end, a second axial end and a through hole extending between the first and second axial ends, the hub shaft extending through the through hole such that the middle portion of the hub shaft is disposed inside the through hole of the annular member;
   a first yoke including a first extended section that extends in the axial direction from the first axial end to the second axial end of the annular member and a first insertion section that extends in the axial direction from the first axial end toward the second axial end of the annular member to be inserted into the through hole of the annular member, the first yoke being non-rotatably arranged relative to the annular member;
   a second yoke including a second extended section that extends in the axial direction from the second axial end to the first axial end of the annular member and a second insertion section that extends in the axial direction from the second axial end toward the first axial end of the annular member to be inserted into the through hole of the annular member, the second yoke being non-rotatably arranged relative to the annular member; and
   a third yoke disposed in the through hole and nonrotatably connected to both the annular member and the hub shaft, the third yoke being disposed axially between tip ends of the first and second insertion sections and magnetically coupling the first and second yokes together, the third yoke having a second protrusion arranged in the axial groove at the middle portion of the hub shaft, the third yoke being a separate piece from the hub shaft, the annular member, the first yoke, and the second yoke with a maximum axial length of the third yoke being smaller than a maximum axial length of the through hole.

2. The bicycle generator hub stator according to claim 1, wherein
   the third yoke is non-rotatably connected to the annular member by an engagement between a first protrusion of one of the annular member and the third yoke, and a first recess of the other of the annular member and the third yoke.

3. The bicycle generator hub stator according to claim 1, wherein
   the third yoke has an annular shape.

4. The bicycle generator hub stator according to claim 1, wherein
   the first and second yokes are fixed to the annular member.

5. The bicycle generator u stator according to claim 1, further comprising
   a first positioning member being attached to the hub shaft at the first axial end of the annular member by crimping, the first positioning member positioning the annular member and the first, second and third yokes along the axial direction of the annular member.

6. The bicycle generator hub stator according to claim 5, wherein
   a second positioning member being attached to the hub shaft at the second axial end of the annular member by crimping and serves to position the annular member and the first, second and third yokes along the axial direction of the annular member.

7. The bicycle generator hub stator according to claim 1, wherein
   the annular member includes a first flange provided on the first axial end and a second flange provided on the second axial end; and
   the first extended section includes an end portion, corresponding to the second axial end of the annular member, which is supported on the second flange, and the second extended section includes an end portion, corresponding to the first axial end of the annular member, which is supported on the first flange.

8. A bicycle generator hub equipped with the bicycle generator hub stator according to claim 1, wherein
   the bicycle generator hub includes a hub shell rotatably mounted on the hub shaft, and the bicycle generator hub stator is located in the hub shell.

9. The bicycle generator hub stator according to claim 1, wherein
   the tip ends of the first and second insertion portions contact the third yoke inside the through hole of the annular member.

10. The bicycle generator hub stator according to claim 1, wherein the axial groove is configured to accommodate an electrical wire.

11. The bicycle generator hub stator according to claim 10, further comprising
a coil wound onto the annular member between the first axial end and the second axial end; and
an electrical wire connected to the coil, at least a portion of the electrical wire being accommodated in at least a portion of the axial groove.

12. The bicycle generator hub stator according to claim 1, wherein
the third yoke is configured to have a constant axial length with respect to a radial direction of the bicycle generator hub.

* * * * *